United States Patent [19]

Buchholz

[11] Patent Number: 4,861,849

[45] Date of Patent: Aug. 29, 1989

[54] SODIUM THIOSULFATE AS PART OF A REDOX INITIATOR SYSTEM FOR THE POLYMERIZATION OF WATER-SWELLABLE POLYMERS

[75] Inventor: Fredric L. Buchholz, Midland, Mich.

[73] Assignee: The Dow Chemical Company, Midland, Mich.

[21] Appl. No.: 144,150

[22] Filed: Jan. 15, 1988

[51] Int. Cl.$^4$ ............................. C08F 4/32; C08F 4/00
[52] U.S. Cl. ..................................... 526/230; 526/234; 526/322
[58] Field of Search ........................ 526/234, 230, 322

[56] References Cited

U.S. PATENT DOCUMENTS 2,937,163   5/1960   Lang .................................. 526/234

*Primary Examiner*—Joseph L. Schofer
*Assistant Examiner*—N. Sarofim

[57] ABSTRACT

This invention relates to a process for polymerizing an aqueous solution of an $\alpha,\beta$-ethylenically unsaturated monomer and at least one crosslinking monomer to produce a water-swellable polymer using sodium thiosulfate as a component of a redox initiator system. The use of sodium thiosulfate as a component of a redox initiator system for the polymerization allows for controlling the rate of initiation so as to increase the time required for gel formation during polymerization. The resulting hydrated polymer of the present invention breaks up more uniformly and with greater ease resulting in a higher per batch yield.

13 Claims, No Drawings

SODIUM THIOSULFATE AS PART OF A REDOX INITIATOR SYSTEM FOR THE POLYMERIZATION OF WATER-SWELLABLE POLYMERS

BACKGROUND OF THE INVENTION

This invention relates to a process for polymerizing an aqueous solution of an $\alpha,\beta$-ethylenically unsaturated monomer and at least one crosslinking monomer to produce a water-swellable polymer.

Polymers which form hydrogels are used in fluid absorbing products such as disposable diapers, incontinent devices and sanitary napkins and are well known in the art. These polymers can be prepared by polymerization of $\alpha,\beta$-ethylenically unsaturated monomers with crosslinking agents. The development of improvements in the processes for preparing these water-swellable polymers is desirable to produce improved products, eliminate by-products and increase production capacity. The improvements in the processes however, should not sacrifice excellent free swell capacity and water-soluble polymer content properties of the polymer.

One technique to increase throughput of the polymer product is to increase the percent solids in the reaction mixture during solution polymerization of the monomer. In order to increase the percent solids, the amount of the solvent, typically water, present must be reduced during the polymerization or the monomer concentration must be increased prior to polymerization. However, a higher ratio of monomer to water also increases the apparent viscosity of the mixture resulting in increased stress on the agitator used during the polymerization to mix the solution and higher power requirements to achieve desired mixing. Such stress is undesirable due to increased wear on the equipment. Additionally, the apparent viscosity of the reaction mixture at higher solids levels is such that attaining that desired mixing with a conventional agitator is difficult, effectively preventing the desired increase in production capacity.

Presently, initiator components such as sodium sulfite are used which impart a polymerization rate more rapid than the mixing rate of the agitator. Therefore, it would be desirable to reduce the initial rate of polymerization. Accordingly, the present invention is such a method for slowing the initial rate of polymerization without sacrificing excellent free swell capacity and water-soluble polymer content properties of the polymer.

SUMMARY OF THE INVENTION

Accordingly the present invention is an improved process for producing a water-swellable polymer having excellent free swell capacity and water-soluble polymer content properties characterized by polymerizing an aqueous solution of an $\alpha,\beta$-ethylenically unsaturated monomer and at least one crosslinking monomer, the improvement comprising using an effective amount of sodium thiosulfate as a component of a redox initiator system for the polymerization.

Another aspect of the present invention is an improved process for producing a water-swellable polymer having excellent free swell capacity and water-soluble polymer content properties characterized by polymerizing an aqueous solution of an $\alpha,\beta$-ethylenically unsaturated monomer and at least one crosslinking monomer, the improvement comprising controlling the rate of initiation so as to increase gel time, which comprises using an effective amount of sodium thiosulfate as a component of a redox initiator system for the polymerization.

DETAILED DESCRIPTION OF THE INVENTION

The operable water-soluble, $\alpha,\beta$-ethylenically unsaturated monomers are those which are capable of reaction by vinyl-addition polymerization in an aqueous solution with a crosslinking monomer to produce a water-swellable, and/or lightly crosslinked hydrophilic gel polymer. The crosslinked structure may be obtained by the copolymerization of the water-soluble monomer and a crosslinking monomer possessing at least two polymerizable double bonds. Operable water-soluble $\alpha,\beta$-ethylenically unsaturated monomers include mono and polycarboxylic acids and acrylamide and its derivatives. Illustrative monocarboxylic acids are acrylic acid, methacrylic acid, crotonic acid and isocrotonic acid, as well as, alkali metal salts and ammonium salts thereof. Illustrative polycarboxylic acids would include maleic acid, fumaric acid and itaconic acid. Acrylamide derivatives would include methacrylamide and N,N-dimethylacrylamide. Preferred monomers are acrylic acid and methacrylic acid as well as their respective salt forms, such as, alkali metal or ammonium salts.

The concentration of monomer which is used in the reaction mixture affects the properties of the final polymer product. Desirable properties for the water absorption may include good gel strength, high absorbent capacity, fast rates of water absorption and low levels of water-soluble polymer. It is desirable to use a concentration of monomer which results in an efficient level of conversion of monomer to polymer together with desired polymer properties. Preferably, at least about 80 percent conversion, more preferably at least about 90 percent and most preferably at least about 99 percent conversion.

The water-soluble, $\alpha,\beta$-ethylenically unsaturated monomers useful in the present invention may be used in amounts ranging from about 10 weight percent to about 80 weight percent based on the total weight of the aqueous monomer solution to be polymerized. Preferably, the amount of such monomers ranges from about 10 percent to about 60 percent based on the total weight of the aqueous monomer solution. Most preferably, water-soluble monomers may be used in amounts ranging from about 15 weight percent to about 40 weight percent based on the total weight of the aqueous monomer solution. Optionally, minor amounts of water-soluble unsaturated monomers other than carboxylic acids, salts of the acids, acrylamide or its derivativese may be present. For example, alkyl esters of the acid monomers such as methacrylate or methylmethacrylate may be used as comonomers.

Conventional vinyl addition polymerization initiators are used in the polymerization of the water-soluble monomers and the crosslinker. The present invention can include conventional vinyl addition polymerization initiators so long as an effective amount of sodium thiosulfate is used as part of the redox initiator system.

Oxidizing agents, such as hydrogen peroxide, can be employed together with sodium thiosulfate which is used as a reducing agent to form the redox initiator system. Water-soluble peroxides are preferred as oxidizing agents, other oxidizing agents such as potassium persulfate, ammonium persulfate, sodium persulfate, alkali metal persulfate, and hydrogen peroxide can also be used. The oxidizing agents can be present in an amount of from about 100 ppm to about 5000 ppm by weight based on the weight of the water-soluble, $\alpha,\beta$-ethylenically unsaturated monomers. More preferably, the oxidizing agents can be present in an amount of from about 100 ppm to about 2000 ppm by weight based on the weight of the water-soluble, $\alpha,\beta$-ethylenically unsaturated monomers. Depending upon the selection of reaction temperature and the type of monomer chosen the oxidizing agents above can be used as thermal initiators. Additional thermal initiators include water-soluble azo compounds such as 2,2'-azobis(2-amidinopropane·HCl). The amount of total initiators used can range from about 0.01 to about 2 weight percent. Preferably, the amount of total initiators is 0.01 to about 1.0 weight percent based on the weight of the total monomer reactants.

The more preferred redox initiator system is tertiary butyl hydrogen peroxide and sodium thiosulfate. Preferably, the tertiary butyl hydrogen peroxide is present in an amount of from about 100 to about 150 ppm by weight based on the weight of the water-soluble, $\alpha,\beta$-ethylenically unsaturated monomers. The sodium thiosulfate is preferably present in an amount effective to initiate polymerization of the $\alpha,\beta$-ethylenically unsaturated monomers and the crosslinking monomer at a rate whereby the gel time is greater than 60 seconds. Typically such an amount of sodium thiosulfate is from about 1200 to about 2000 ppm by weight based on the weight of the water-soluble, $\alpha,\beta$-ethylenically unsaturated monomers. The amount of total initiators used can range from about 0.01 to about 2 weight percent. Preferably, the amount of total initiators is 0.01 to about 1.0 weight percent based on the weight of the total monomer reactants.

The polymerization temperature for the polymerization is preferably a relatively low temperature, as this in general increases the molecular weight of the resulting crosslinked polymer relative to that attained at higher temperatures. Thermal initiators operable in the preferred reaction temperature range are advantageous.

Types of Crosslinking Monomers:

Organic compounds having two or more ethylenic groups copolymerizable with the water-soluble monomers can be used as the crosslinking monomers. Exemplary crosslinking monomers including diacrylate or dimethacrylate esters of ethylene glycol, diethylene glycol, triethylene glycol, propylene glycol, 1,4-butane diol, 1,5-pentane diol, 1,6-hexane diol, neopentyl glycol, trimethylol propane and pentaertythritol; triacrylates or trimethacrylates of trimethylol propane and pentaerythritol; tetracrylates or tetramethacrylates of pentaerythritol; N,N'-methylene-bis-acrylamide, N,N'-methylene-bis-methacrylamide and triallyl isocyanurate, and the like.

The crosslinking monomer is present in the reaction mixture of water-soluble monomer in an amount effective to crosslink the polymer to the desired degree. Typically the crosslinking monomer is used in amounts ranging from about 0.0001 to about 5 parts by weight based on 100 parts by weight of water-soluble monomer used. More preferably, the amount ranges from about 0.01 to about 2 parts by weight, and most preferably, from about 0.02 to about 1 part by weight, per 100 parts by weight of the water-soluble monomer. If an amount over 5 parts by weight of crosslinking monomer is used the resulting polymer generally has such a high crosslinking density that the water absorption capacity of the polymer is reduced. If the crosslinker is used in an amount less than about 0.0001 part by weight, the polymer generally has too low a crosslinking density and when contained with the fluid to be absorbed becomes sticky and exhibits a lower initial absorption rate. The preferred amount of crosslinking monomer is determined by the desired degree of absorption capacity and the gel strength desired to retain the absorbed fluid.

Typical Polymerization Conditions

For the aqueous solutions copolymerization, according to the present invention, the water-soluble monomer, the crosslinking monomer, water and the initiator are mixed in a conventional manner prior to the copolymerization.

Mixing may be effected with static-in-line mixers or any other suitable mixing apparatus. The temperature during introduction of the polymerization initiator should be maintained such that the polymerization is not initiated prematurely, preferably, below the temperature of about 40° C., more preferably below about 35° C.

In a preferred embodiment of this invention, the level of water-soluble in the polymer from a monomer can be minimized by careful control of the temperature during the exothermic polymerization. Therefore, conducting the reaction under reduced pressure with agitation of the reactants is desirable to control temperature. The maximum reaction temperature for the polymerization when preferred initiators are used is in the range of from about 90° to about 120° C. More preferably, the maximum temperature is in the range from about 60° to about 90° C. External cooling jackets alone are generally not effective to provide the desired reaction temperature control when a large reaction vessel is used with a gel-like reaction product.

Sodium thiosulfate, as part of a redox initiator system, can be used in other polymerization processes of the water-soluble $\alpha,\beta$-ethylenically unsaturated monomers, such as an inverse emulsion polymerization. The resulting hydrated gel-like polymer may be used to prepare the water-swellable polymer composition by drying of the hydrated polymer gel. It is desirable to dry the hydrated polymer gel at as high an efficiency an in as short of time as possible in order to prevent the deterioration of the polymer by excessive heat.

The desirable method of drying comprises heating the polymer by hot air to a temperature of about 50° C. to about 200° C. optionally under reduced pressure for a period of time sufficient to reduce the moisture content of the hydrated polymer gel to below about 40 percent, preferably below about 4 percent based on the total weight of absorbent polymer.

The absorbent polymer composition obtained by drying the hydrated polymer gel under heat is suitably comminuted into coarse particles, granules or a powder depending upon the desired size. The method of pulverization is not generally critical and any method known in the art can be employed.

Agitation of the reaction medium during polymerization can also be used to control the particle size.

The absorbent polymer composition of the present invention has excellent performance characteristics. The polymer has a high degree of polymerization because it has been prepared from the gel-like hydrated polymer formed by copolymerization in an aqueous solution at a relatively high solids concentration.

Moreover, it is efficiently and uniformly crosslinked by initiating the copolymerization of the water-soluble monomer and the crosslinking monomer with an effective amount of sodium thiosulfate in a redox initiator package to promote polymerization at a controlled rate. The slower the rate of initial polymerization, the more uniform the mixing of the initiators and the monomers. The resulting absorbent polymer composition has a very low water-soluble polymer content and thus is less sticky when in contact with an aqueous fluid.

The rate of initial polymerization can be determined by measuring the time from initiating polymerization to the time a polymer gel is formed. Polymer gel time can be determined as follows. The polymerization of a 25 percent by weight solution of acrylic acid in water and crosslinker is conducted in a flat-bottom, one liter resin-reaction kettle. The initial mixing of monomer solution with initiators can be accomplished using a 1¼ inch long cylindrical Teflon ® (a Trademark of DuPont) coated stirring bar beig turned in the reactor at about 100–400 rpm by an external magnetic stirrer, (model number 1250 available from Lab-Line Instruments, Inc., Melrose Park, Ill.). The polymer is deemed to have gelled when the magnetic stir bar used to agitate the polymer ceases to turn in the reaction mixture. Preferably, the gel time is between 60 and 150 seconds, more preferably between 80 and 150 seconds, most preferably between 100 and 150 seconds when the polymerization is initiated at a temperature in the range from about 15° to about 25° C.

Additionally, the resulting hydrated polymer of the present invention breaks up more uniformly and with greater ease resulting in a higher per batch yield. The polymer composition exhibits a water-soluble polymer content of less than about 20 percent, preferably less than about 15 percent and most preferably less than about 10 percent based on the total weight of the absorbent polymer.

Water-soluble polymer content is determined by extracting 1 gram of absorbent polymer at room temperature for 16 hours with 300 grams of 0.9 percent aqueous sodium chloride. The swollen polymer is filtered off and the filtrate titrated with 0.1 Normal hydrochloric acid to determine the level of soluble polymer present.

The absorbent capacity is determined by allowing 1.0 g to absorb its limit of 300 g of a 0.9 percent aqueous sodium chloride solution in 20 minutes at room temperature. The excess salt solution which is not absorbed is weighed and subtracted from the original 300 g to give the free swell capacity (FSC) value. The absorbent polymer compositions of the present invention exhibit absorbent capacities of at least about 10 g/g, more preferably at least about 20 g/g, and most preferably at least about 40 g/g. Absorbent capacities up to about 80 g/g have been observed.

EXAMPLES

The following examples illustrate preparation of a polymer using a redox initiator system containing sodium thiosulfate. The examples are not meant to limit the scope of the invention but are tended to be illustrative of the invention and the performance of polymers prepared by such a process.

EXAMPLES 1–10

Rate of Polymerization

In a 1-liter glass reactor is dissolved 1.50 g (0.75 percent based on the weight of monomers) of trimethylolpropanetriacrylate (TMPTA) in 200 g of acrylic acid. To this solution, 577.0 g of distilled water is added. 0.5 Gram of VERSENEX ® 80 chelating agent (40 percent aqueous solution of pentasodium salt of diethylenetriaminepentaacetic), available from The Dow Chemical Company, is added. The solution is agitated at 150 rpm using a 1¼ inch Teflon ® coated magnetic stir bar while sparging the solution with nitrogen gas at a flow rate of approximately 380 ml per minute. 6.24 Grams of a 10 percent by weight aqueous solution of sodium persulfate is added to the mixture followed by 1.04 g of a 10 weight percent aqueous solution of 2,2'-azobis(2-amidinopropane)dihydrochloride (V-50 Wako Pure Chemistry Industry). To the resulting solution is added 3.12 g of a 1 percent aqueous solution of tertiary butyl hydrogen peroxide (TBHP) and 2.64 g of a 15 percent aqueous solution of sodium thiosulfate pentahydrate. In comparative experiments polymers are prepared as above however, sodium sulfite is used instead of sodium thiosulfate. The levels of initiator are given in Table I.

The reactor is maintained at a temperature of no more than 85° C. by, if necessary, a heated jacket around the reactor to elevate the temperature or a vacuum to reduce the pressure to lower the temperature in the reactor. The reaction is allowed to proceed until complete as evidenced by complete conversion of the monomers to polymer. (Gelation generally occurs at about 1 percent conversion and is not indicative of complete reaction.) The reaction contents are held at a reaction temperature of about 85° C. after completion of the reaction. The gel is then neutralized by mixing a crumbled known amount in the reactor with 25 weight percent aqueous solution of sodium carbonate such that about 70 percent of the carboxylic acid groups present in the polymer are neutralized. The gel is then dried in an oven at about 110° to 150° C. After drying, the polymer is cooled to room temperature and pulverized in a Waring Commercial Blendor ®.

The free swell capacity (FSC) is determined by allowing 1.0 g of the polymer to absorb its limit of 300 g of a 0.9 percent aqueous sodium chloride solution in 20 minutes. The excess salt solution which is not absorbed is weighed and subtracted from the original 300 g to give the free swell capacity value.

Water-soluble polymer content is determined by extracting 1 g of absorbent polymer granules for 16 hours with 300 g of a 0.9 percent solution of aqueous sodium chloride. The swollen polymer is filtered off and the filtrate is titrated with hydrochloric acid to determine the level of soluble polymer present.

The polymer composition of this example exhibits an FSC of about 40 g/g and a water-soluble polymer content of 6 percent.

The data in Table I depict the increase in gel time (time of polymerization from time=0 to time polymer gels) when sodium thiosulfate is used with TBHP as a redox initiator system over the use of sodium sulfite with TBHP.

Polymer gel time can be determined as follows. The polymerization of a 25 percent by weight solution of acrylic acid in water and crosslinker is conducted in a one liter resin-reaction kettle. The initial mixing of monomer solution with initiators can be accomplished using a 1¼ inch long cylindrical Teflon ® coated stirring bar being turned in the reactor at about 100–400 rpm by the external magnetic stirring motion. The polymer is deemed to have gelled when the magnetic stir bar used to agitate the polymer ceases to turn in the reaction mixture.

Each of the examples and comparative examples of Table I were polymerized similarly to Example 1. The variants from Example 1 are those listed in the Table.

The data also indicates a slower initial rise in temperature of the polymerization when sodium thiosulfate is used indicating a slower initiation rate.

torque on the agitator assembly, and is recorded as a function of time using a strip chart recorder. (The temperature is also recorded throughout the polymerizations.)

The Comparative Experiment C-D exhibits the highest level of torque, 142 mv, during the polymerization at 1 hr.–1 hr. 10 minutes after initiation and at a temperature of 69° C. The Example 11 torque at the highest level during the polymerization measures 82 mv at 50 minutes after initiation and at a temperature of 64° C.

Therefore, there is much less torque required to turn the agitator during the polymerization using thiosulfate as a reducing agent in the initiator package as opposed

TABLE I

Summary of Polymerizations for Initiator Optimization

| Example | Reducing Agent (RA) | ppm of RA | Initial Temperature (°C.) | Percent Solids | TBHP ppm | Gel Time, sec | Time for 5° C. Rise, sec |
|---|---|---|---|---|---|---|---|
| C-A* | Sulfite | 100 | 20 | 25 | 100 | 10 | 15 |
| C-B* | Sulfite | 150 | 10 | 25 | 150 | 10 | 15–20 |
| C-C* | Sulfite | 150 | 10 | 25 | 150 | 10 | 10 |
| 2 | Thiosulfate | 1200 | 11 | 25 | 105 | 146 | 270 |
| 3 | Thiosulfate | 1800 | 12 | 25 | 105 | 108 | 142 |
| 4 | Thiosulfate | 2400 | 10 | 25 | 105 | 68 | 80 |
| 5 | Thiosulfate | 900 | 11 | 30 | 105 | 125 | 168 |
| 6 | Thiosulfate | 1200 | 12 | 30 | 105 | 82 | 81 |
| 7 | Thiosulfate | 1200 | 11 | 30 | 105 | 90 | 128 |
| 8 | Thiosulfate | 1800 | 10 | 30 | 105 | 72 | 60 |
| 9 | Thiosulfate | 1800 | 10 | 30 | 200 | 103 | 100 |
| 10 | Thiosulfate | 2400 | 11 | 30 | 105 | 71 | 43 |

*Not an example of this invention.

EXAMPLE 11

Torque Measurements

Acrylic acid and TMPTA are polymerized similarly to Example 1, except that the reaction is conducted in a 2-liter glass reactor and into the reactor is charged: 300 g acrylic acid, 2.10 g TMPTA, 0.75 g Versenex 80, 825 g water. The components of the initiator package also differ from Example 1: the amount of sodium persulfate is 10.0 ml of a 10 percent solution; Wako V-50 is 1.50 ml of a 10 percent solution; TBHP is 9.0 ml of a 1 percent solution. Sodium thiosulfate is added in the amount of 5.00 ml of a 15 percent solution of the pentahydrate. A Comparative Experiment C-D is prepared as above however, 5.00 ml of a 1 percent sodium sulfite solution is added rather than the sodium thiosulfate of Example 11.

At the completion of the reaction the agitators are removed from the reactors and the amount of crumbled gel remaining in the reactor is measured. 901 Grams gel remained in the reactor for Example 11 and 708 g crumbled gel remained in the reactor for Comparative Experiment C-D. The greater amount of gel remaining in the reactor for the thiosulfate initiator over the comparative sulfite initiator is indicative of a lesser amount of gel remaining on the agitator. Thus, the conditions for reactor fouling are lessened when thiosulfate is used as the reducer in the initiator package.

The amount of torque on the agitator is measured during the polymerization of both Example 11 and Comparative Experiment C-D. In both Example 11 and Comparative Example C-D, the agitation is provided by a steel shaft with several blades attached. This agitator is turned by an electric motor (supplied by Electro-Craft Corp. Model E 650MG) which is controlled at a constant speed (r.p.m.) by a Master Servodyne unit (supplied by Cole Parmer Co.). The voltage necessary to maintain a constant R.P.M. is proportional to the to the use of sulfite. Consequently, there is less wear on the reactor and the per batch yield of product is increased because less product is lost in reactor fouling. Maintenance of the reactor would also be reduced.

What is claimed is:

1. An improved process for producing a water-swellable polymer having excellent free swell capacity and relatively low water-soluble polymer content properties characterized by polymerizing an aqueous solution of an α,β-ethylenically unsaturated monomer and at least one crosslinking monomer, the improvement comprising using an effective amount of sodium thiosulfate as a component of a redox initiator system for the polymerization.

2. The process of claim 1 wherein the sodium thiosulfate is present in an amount of from about 1200 to about 2000 ppm by weight based on the weight of α,β-ethylenically unsaturated monomer and wherein the initiator system additionally comprises tertiary butyl hydrogen peroxide.

3. The process of claim 2 wherein the tertiary butyl hydrogen peroxide is present in an amount of from about 100 to about 150 ppm by weight based on the weight of the α,β-ethylenically unsaturated monomer.

4. The process of claim 3 wherein the α,β-ethylenically unsaturated monomer consists of acrylic acid in an amount of from about 10 to about 80 weight percent based on the total weight of the aqueous monomer solution.

5. The process of claim 2 wherein the α,β-ethylenically unsaturated monomer is acrylic acid and is present in an amount of from about 10 to about 60 weight percent based on the total weight of the aqueous monomer solution.

6. The process of claim 2 wherein the α,β-ethylenically unsaturated monomer is acrylic acid and is present in an amount of from about 15 to about 40 weight percent based on the total weight of the aqueous monomer solution.

7. The process of claim 4 wherein the crosslinking monomer is trimethylol propane triacrylate present in an amount of from about 0.0001 to about 5 parts by weight based on 100 parts of the $\alpha,\beta$-ethylenically unsaturated monomer.

8. The process of claim 4 wherein the crosslinking monomer is trimethylol propane triacrylate present in an amount of from about 0.01 to about 2 parts by weight based on 100 parts of the $\alpha,\beta$-ethylenically unsaturated monomer.

9. The process of claim 4 wherein the crosslinking monomer is trimethylol propane triacrylate present in an amount of from about 0.02 to about 1 parts by weight based on 100 parts of the $\alpha,\beta$-ethylenically unsaturated monomer.

10. An improved process for producing a water-swellable polymer characterized by polymerizing an aqueous solution of an $\alpha,\beta$-ethylenically unsaturated monomer and at least one crosslinking monomer, the improvement comprising controlling the rate of initiation so as to increase gel time, which comprises using an effective amount of a sodium thiosulfate as a component of a redox initiator system for the polymerization whereby time required for gel formation during polymerization is increased.

11. A process of claim 10 whereby the gel time for the polymerization is between about 60 and about 150 seconds when the polymerization is initiated at a temperature in the range from about 15° to about 25° C.

12. A process of claim 10 whereby a gel time for the polymerization is between about 80 and about 150 seconds when the polymerization is initiated at a temperature in the range from about 15° to about 25° C.

13. A process of claim 10 whereby a gel time for the polymerization is between about 100 and about 150 seconds when the polymerization is initiated at a temperature in the range from about 15° to about 25° C.

* * * * *

UNITED STATES PATENT AND TRADEMARK OFFICE
CERTIFICATE OF CORRECTION

PATENT NO. : 4,861,849

DATED : August 29, 1989

INVENTOR(S) : Fredric L. Buccholz

It is certified that error appears in the above-identified patent and that said Letters Patent is hereby corrected as shown below:

Column 2, line 54, "derivativese" should read "derivatives".

Column 4, line 7, "contained" should read "contacted"; line 27, "water-soluble" should read "water-solubles".

Column 5, line 23, "beig" should read "being"; line 66, "tended" should read "intended".

Signed and Sealed this

Seventh Day of May, 1991

Attest:

HARRY F. MANBECK, JR.

Attesting Officer

Commissioner of Patents and Trademarks